United States Patent
Das et al.

(10) Patent No.: US 8,515,491 B2
(45) Date of Patent: Aug. 20, 2013

(54) USER DISTANCE DETECTION FOR ENHANCED INTERACTION WITH A MOBILE DEVICE

(75) Inventors: Saumitra M. Das, San Jose, CA (US); Hui Chao, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 181 days.

(21) Appl. No.: 13/193,275

(22) Filed: Jul. 28, 2011

(65) Prior Publication Data

US 2013/0029723 A1    Jan. 31, 2013

(51) Int. Cl.
*H04W 88/02*    (2009.01)
(52) U.S. Cl.
USPC .......................................... 455/557; 455/566
(58) Field of Classification Search
USPC ................. 455/557, 566; 345/156, 158, 168;
348/14.07, 14.1, 46, 47, 49, 50
See application file for complete search history.

(56) References Cited

U.S. PATENT DOCUMENTS

| | | | |
|---|---|---|---|
| 7,783,084 B2 * | 8/2010 | Imagawa et al. | 382/118 |
| 2006/0103808 A1 * | 5/2006 | Horie | 351/202 |
| 2011/0084897 A1 * | 4/2011 | Manoharan et al. | 345/156 |
| 2011/0141114 A1 * | 6/2011 | Chen et al. | 345/428 |
| 2012/0086834 A1 * | 4/2012 | Adachi | 348/239 |

OTHER PUBLICATIONS

Cootes, T.F., et al., "Active appearance models," IEEE Trans. Pattern Analysis and Machine Intelligence, vol. 23, No. 6, Jun. 2001, pp. 681-685.
Xin, S., et al., "Face Alignment Under Various Poses and Expressions," ACII: 40-47, 2005.

* cited by examiner

*Primary Examiner* — Cong Tran
(74) *Attorney, Agent, or Firm* — Neugeboren O'Dowd PC

(57) ABSTRACT

Methods and apparatus for displaying content on a mobile device are disclosed. In one embodiment, a method includes obtaining content to display on the mobile device, obtaining distance information indicative of a distance that separates a user from the mobile device, accessing content-size data on the mobile device that is associated with the distance information, and adjusting a presentation of content on the mobile device based upon the content-size data.

17 Claims, 7 Drawing Sheets

USER DISTANCE DETECTION FOR ENHANCED INTERACTION WITH A MOBILE DEVICE

FIELD OF THE INVENTION

The present invention relates to computing devices. In particular, but not by way of limitation, the present invention relates to apparatus and methods for presenting content on computing devices.

BACKGROUND OF THE INVENTION

Viewing content such as text, images, and graphics, on mobile content display devices such as smartphones, netbooks, gaming devices, PDAs, and laptop computers has become increasingly ubiquitous among users. Many of these mobile devices have a relatively small screen size (e.g., as compared to desktop computer displays), and as a consequence, the content that is displayed on these mobile devices is often presented in a relatively small size to fit the content on a display. And because content display devices are used for many functions (e.g., navigation, web browsing, reading) and are so easily moved, often times the size of text that is presented is less than ideal.

Although some content display devices enable a user to manually adjust a size of content (e.g., by increasing the size of content to see more detail or decreasing the size to see a wider range of content). The adjustment of content, however, often requires negotiating multiple menu layers to adjust content, or finger gestures that require motions that may be inconvenient to carry out. And in many environments (e.g., within an automobile or engaged in other activities that occupy the user's hands) it is very difficult or impossible to safely or quickly adjust content size. Accordingly, currently available content display devices operate in a less-than-ideal manner and will most certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several aspects, the invention may be characterized as a method for displaying content on a mobile device. The method may include obtaining content to display on the mobile device, obtaining distance information indicative of a distance that separates a user from the mobile device, accessing content-size data on the mobile device that is associated with the distance information, and adjusting a presentation of content on the mobile device based upon the content-size data.

Other aspects include a mobile device that includes an application associated with content that is displayed on the mobile device, a sensor and sensor processing components to provide information from the sensor that includes an indication of a distance that separates a user from the mobile device, a user distance detection component that is configured to estimate, based upon the indication, the distance the user is away from the content display device and access content-size data that is associated with the distance, a content adjust engine that is configured to adjust a presentation of the content that is displayed on the mobile device based upon the content-size data.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
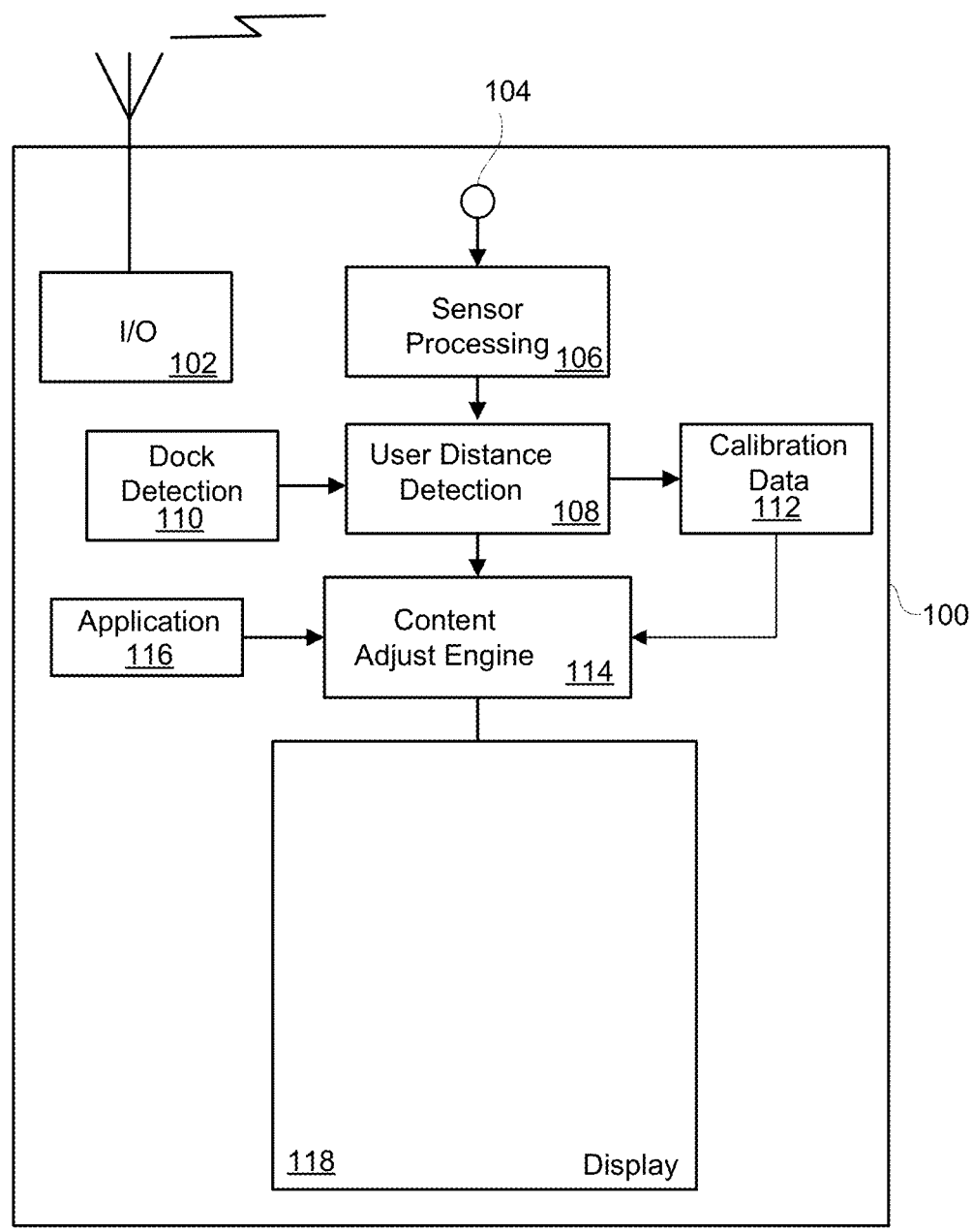
FIG. 1 is a block diagram depicting an exemplary content display device.

Referring to FIG. 1, shown is a block diagram depicting an exemplary content display device 100 in which many embodiments of the present invention may be implemented. As shown, the content display device 100 is generally configured to receive content and communicate via an input/output component 102 to remote web servers, proxy servers (not shown), or other sources of content (e.g., webpages) for a user of the content display device 100. The content display device 100 may be realized by a wireless communications device (WCD) such as a smartphone, PDA, netbook, tablet, laptop computer and other wireless devices. But the content display device 100 may work in tandem with wireline and wireless communication devices. The content display device 100 may communicate with the Internet via local area networks, cellular networks (e.g., CDMA, GPRS, and UMTS networks), WiFi networks, and other types of communication networks.

In general, several embodiments of the present invention enable the size of displayed content on the display device 100 to be adjusted based upon a user's distance from the content display device 100 so that when the user is farther from the content display device 100, the size of the displayed content is increased, and when the user is closer, the size of the content is decreased or vice versa. Beneficially, a user need not use their finger or a menu system to keep adjusting the displayed content, nor does the user need to bring the content display device close to their eyes to be able to read or discriminate details of content on the content display device.

In addition, if the content display device 100 is operating in a docked-mode (e.g., within a dock of a car) text or other content may automatically be displayed at a size (based upon the docked-mode status) so that the subject matter of the content may be read comfortably by the user without reaching for the content display device 100 or undocking it. And as discussed further herein, in some embodiments (discussed further in connection with FIG. 3) the sensor 104, sensor processing component 106, and user detection component 108 include front facing camera elements that can identify specific users, discriminate between users, and identify whether a user has prescription glasses on (so the content can be adjusted in size accordingly)

Figure 2A:
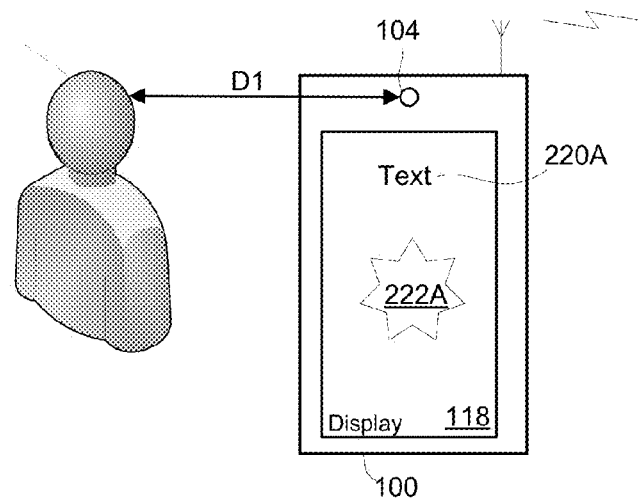
FIGS. 2A-2C are drawings depicting operation of the exemplary content display device depicted in FIG. 1.
Figure 2B:
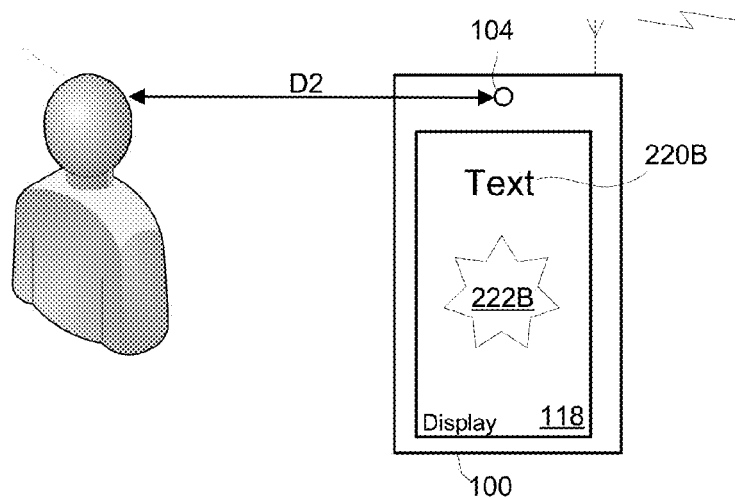
Figure 2C:
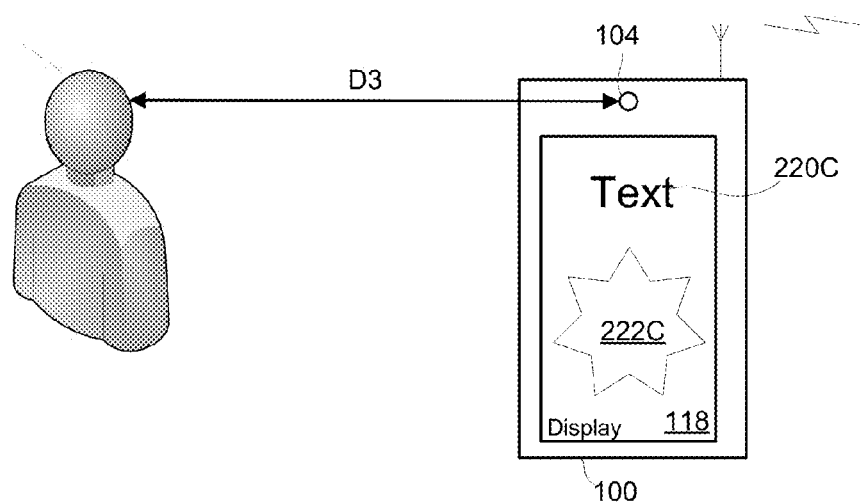

Referring to FIGS. 2A-2C for example, shown are depictions of how the size of text content 220A, 220B, 220C and non-text content 222A, 222B, and 222C varies with increasing distances D1, D2, D3, respectively consistent with several embodiments. As shown, when a distance is increased from D1 in FIG. 2A to D2 in FIG. 2B, the text content 220B and non-text content 222B in FIG. 2B is presented in a larger font and size, respectively, than the same text content 220A and non-text content 222A in FIG. 2A.

And similarly, when the distance is increased to D3 (where D3>D2>D1), the text content 220C and non-text content 222C in FIG. 2C is presented in a larger font and size, respectively, than the same text content 220A, 220B and non-text content 222A, 222B in FIGS. 2A and 2B. Although both text content 220A, 220B, 220C and non-text content 222A, 222B, 222C are depicted as being adjusted in FIGS. 2A-2C, this is certainly not required, and in some implementations only the size of text content 220A, 220B, 220C is adjusted, and in other implementations only the size of non-text content 222A, 222B, 222C is adjusted. In addition, it also contemplated that only some text content may be adjusted while other text content remains the same size, and similarly, that only some non-text content is adjusted while other non-text content is not adjusted.

As shown, in addition to the input/output portion 102, the content display device 100 includes a sensor 104, a sensor processing component 106, a user distance detection component 108, which is coupled to a dock detection component 110, calibration data 112, and a content adjust engine 114, which is in communication with an application 116 and a display 118.

The illustrated arrangement of these components is logical, the connections between the various components are exemplary only, and the depiction of this embodiment is not meant to be an actual hardware diagram; thus one of ordinary skill in the art will readily appreciate that the components can be combined or further separated and sub-divided in an actual implementation, and the components can be connected in a variety of ways without changing the basic operation of the system. Moreover, components may be removed and/or supplemented so that more or less components can be utilized in any particular implementation.

For example, the I/O component 102 and sensor processing 106 depicted in FIG. 1 will include several constituent components, which may vary, when realized in the embodiments discussed further herein. In general, the sensor 104 obtains information that can be used as an indication of a distance that the user is away from the content display device 100, and the sensor processing component 106 receives this information from the sensor 104 and processes the information so that it may be utilized by the user distance detection component 108 to calculate a distance the user is away from the content display device 100. For example, the sensor 104 may be any one of a variety of technologies (e.g., infrared, ultrasonic, and optical image capturing (e.g., a camera sensor)) that generates analog information, which (depending upon the particular sensor technology utilized), the sensor processing component 106 may amplify, sample, and convert to a digital representation of the sensed analog information. And the user distance detection component 108 utilizes the digital representation of the information from the sensor 104 and sensor processing component 106 to calculate a distance that the user is from the content display device 100.

In some embodiments (e.g., the embodiment described with reference to FIG. 3), the sensor 104 and sensor processing component 106 may be realized by components associated with a front facing camera, and the user distance detection component 108 analyzes digital image data of the user to estimate a distance between the content display device 100 and the user.

Figure 6:
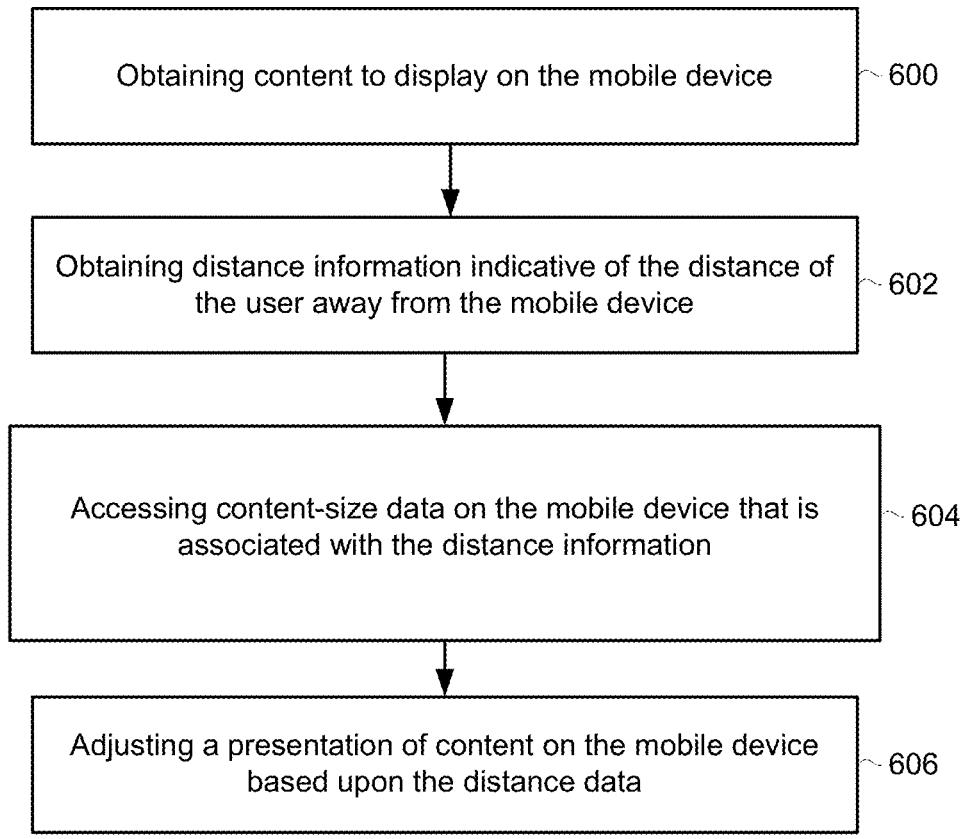
FIG. 6 is a flowchart that depicts a method that may be utilized for operating the content display devices of FIGS. 1 and 3.

As shown, the user distance detection component 108 in this embodiment is also utilized to generate calibration data 112 to establish, as discussed further herein in connection with FIG. 6, a collection of data that associates each of a plurality of distances to a corresponding content-size-information. Although the calibration data 112 may be configured by each user of the content display device 100, it may be populated in advance with default values that may be utilized by the content adjustment engine 114.

In general, the content adjustment engine 114 functions to adjust the size of content that is displayed based upon the estimate of the distance (provided by the user distance detection component 108) between the content display device 100 and the user. In the embodiment depicted in FIG. 1, the content is received from an application 116, which may be realized by a variety of application types including a web browser, gaming applications, utility applications, navigation applications, and any other application 116 that provides content for display.

Also shown is a dock detection component 110, which generally operates to detect if the content display device 100 is in a docked mode (e.g., when the content display device 100 is being used in an automobile for navigation). In these types of uses, the distance of the user may not be reliably estimated because the sensor 104 may not have a clear view of the user to sense the position, and hence, the distance of the user. As a consequence, when the dock detection component 110 senses that the content display device 100 is in a docked position, the content of the display 118 is automatically adjusted to a preset level, which may be configurable.

In the specific context of the content display device 100 being docked in an automobile, the distance between the driver/user and the content display device 100 is well known with some variance; thus the size of the content may be set based upon this known distance. And in some implementations, when the dock detection component 110 detects that the content display device 100 is a docked-mode of operation, the user distance detection component 108 accesses the calibration data 112 to obtain content-size information for the distance associated with docked-mode. In addition, it is also contemplated that a user may manually activate the docked-mode of use to initiate the display of content at the size associated with the docked-mode.

Figure 3:
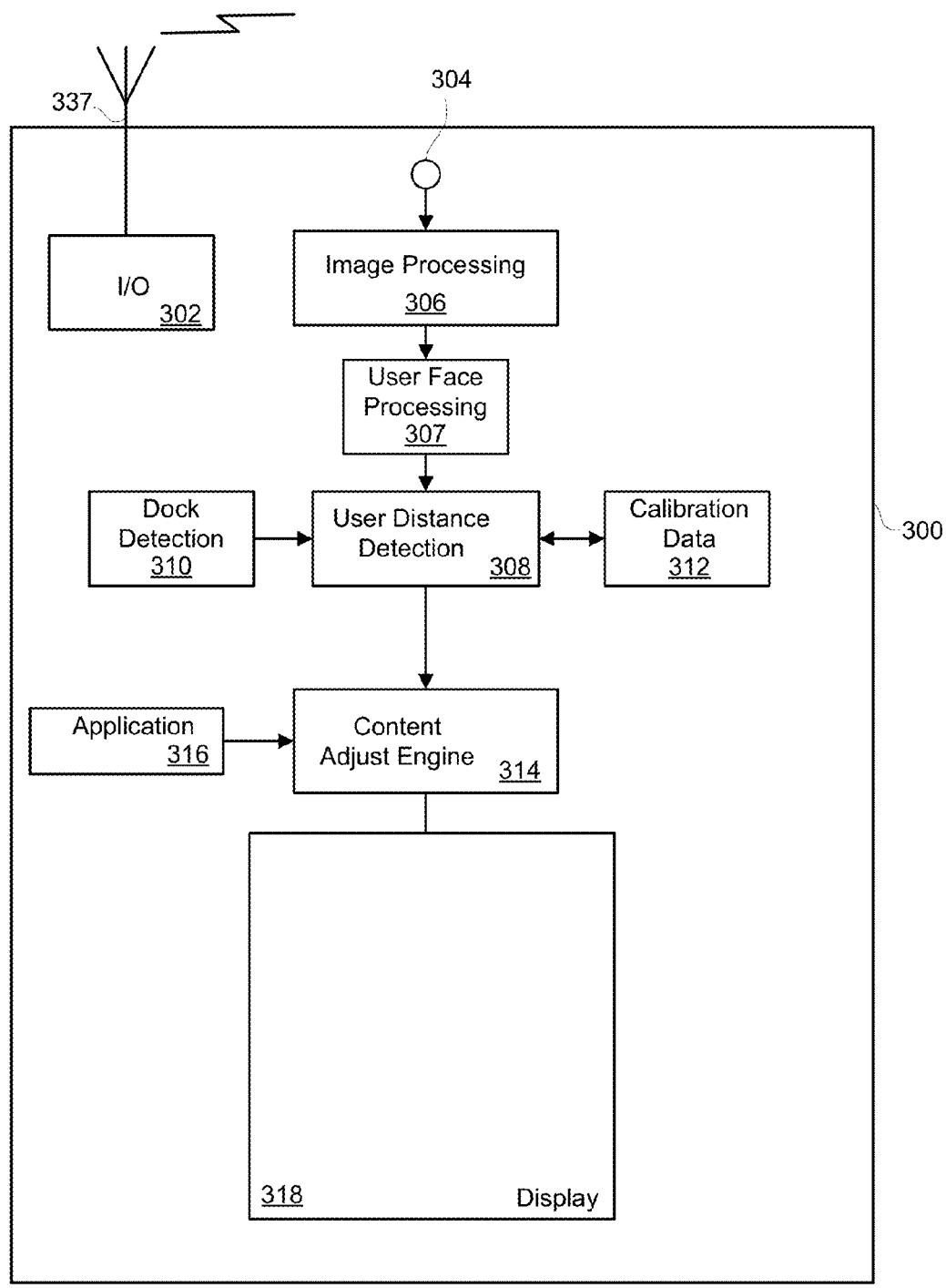
FIG. 3 is a block diagram depicting another exemplary content display device.

Referring next to FIG. 3, shown is a particular embodiment of a content display device 300 that may be utilized to realize the content display device 100 described with reference to FIG. 1. As shown, in this embodiment the content display device 300 includes components associated with a front facing camera including a visual interface 304 and image processing components 306. The visual interface 304 in this embodiment includes components associated with capturing light and converting the captured light into digital image data. As one of ordinary skill in the art will appreciate for example, the visual interface 304 may include optical components, sensors (e.g., CCD or CMOS image sensors), and associated power hardware and controls. And the image processing component 306 is configured to process the image data that is generated from the visual interface 304 to produce image data and it may be realized by software, firmware, and/or hardware, and memory.

Also shown is a user face processing component 307 that generally operates to detect a user's face in the image data that is generated by the image processing component 306. For a given image for example, the user face processing component 307 may first identify face regions, and then detect the position and alignment points of the face. This process locates the face position and estimates the in-plane and out-plane rotation of the face, it also identifies facial components such as eyes and mouth. This information can be used to normalize the face by aligning and warping each detected face to a common frontal face coordinate system. In this normalized coordinate system the size of the face can be estimated, and the user's distance from the content display device 300 can be estimated based upon the size of the user's face in relation to the background of the image. For example, if the user's face is 80 percent of the captured image, then the user is closer than if the face is 30 percent of the camera image.

Figure 4:
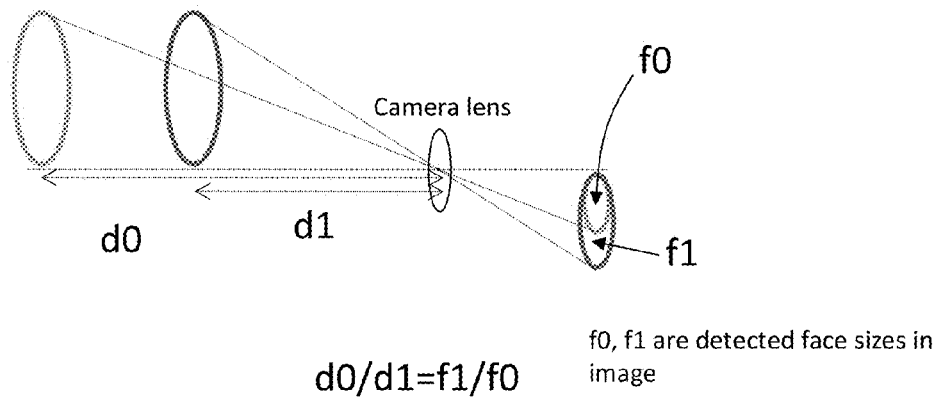
FIG. 4 is drawing depicting a relationship between a distance that a user is from a content display device and a percentage of a captured image the user's face occupies.

Referring to FIG. 4 for example, the relative distance (d1) between a face of the user and the content display device 300 can be estimated based upon the size of the user's face (f1) in a captured image as compared to the size of the user's face (f0) and distance (d0) under a calibrated condition based upon the relation $d0/d1=f0/f1$. As a consequence, the calibration data 312 in this embodiment may include a lookup table including a plurality of datasets wherein each of the datasets includes a ratio (of face size to background size) and desired content size. And the user distance detection component 308 uses the ratio of the user's face size to the background size at runtime as compared to the calibration data to obtain a desired content size.

Also shown is a dock detection component 310, which generally operates in the same manner as the dock detection component 110 described with reference to FIG. 1 to detect if the content display device 300 is in a docked mode, and if so, the content display device 300 displays content at a content size that has been pre-established for the docked-mode of operation.

Figure 5:
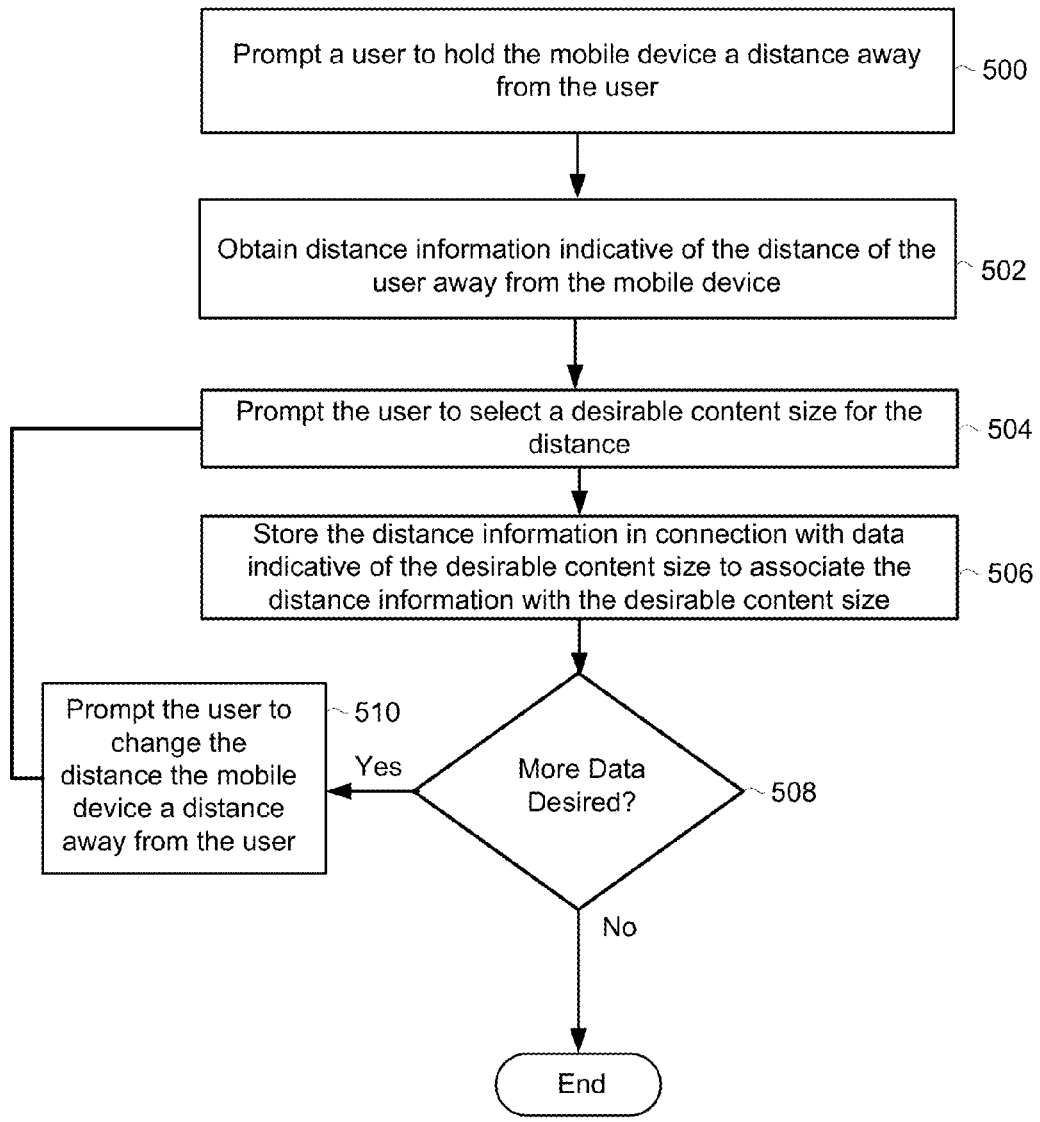
FIG. 5 is a flowchart depicting an exemplary calibration process that may be used in connection with the of content display devices of FIGS. 1 and 3.

Referring next to FIG. 5, shown is an exemplary process for generating the calibration data 112, 312 depicted in FIGS. 1 and 3. As shown, initially a user of the content display device 100, 300 is prompted to hold the content display device 100, 300 a distance away from the user (Block 500), and then distance information that is indicative of the distance of the user from the content display device 100, 300 is obtained (Block 502).

Generally, the distance information is obtained using sensing technology (e.g., the sensor 104 or the visual interface 304) to obtain the distance information. As one of ordinary skill in the art will appreciate, there are well known techniques for translating the outputs of sensors (e.g., IR sensors) to distance information, and as previously discussed, when the visual interface 304 (e.g., front facing camera) is utilized, the percentage of an image that the user's face occupies (e.g., a ratio of the user's face size in the image to the total image size) is indicative of the distance that the user is away from the content display device 100, 300. Thus, the distance information may take on a variety of formats and need not be in terms of distances per se.

As shown, in connection with a particular distance, the user is prompted to select a desirable content size for the particular distance (Block 504). For example, in some implementations, the user distance detection component 108, 308 may generate a plurality of content size options for the user to select. In the context of a touch screen device for example, the user may simply touch the content that is presented at a desired size. More specifically, the user simply selects the presented content that is sized at a comfortable level for the user (e.g., a text size that the user can immediately read or a graphic the user can immediately recognize).

The distance information is then stored in connection with data indicative of the desirable content size to associate the distance information with the desirable content size (Block 506). As a consequence, in many implementations a data pair is created that includes a value indicative of the distance that the user is from the content display device 100, 300 and another value that is indicative of a desired content size.

The value that is indicative of the distance may take on any of a variety of formats. For example, the value may simply be a distance value (e.g., in terms of centimeters), it may be a value that is indicative of a signal level (e.g., voltage level) that is output by the sensor 104, or it may be a value that indicates the percentage of an image that the user's face occupies in an image captured by the visual interface 304. But these are merely examples and one of ordinary skill in the art, in view of this disclosure, will appreciate that the form of the value can take on a variety of formats.

As shown, if more calibration data is desired (Block 508), then the user is prompted to change the distance that the content display device 100, 300 is from the user (Block 510), and the steps discussed above in connection with blocks 504 and 506 are carried out again to create another data pair that is stored in the calibration data 112, 312. The number of times a user is prompted to change the distance the content display device is away from the user (Block 506) and to select a desirable content size (Block 504) may vary, but it is contemplated that an improved user experience may be obtained with less than five samples (that generate five data pairs). And even just two samples (e.g., one normal close-reading sample and a second arms-length sample) can be used to improve a user's experience when the calibration data is in use.

Referring next to FIG. 6, shown is an exemplary method for dynamically adjusting the size of content on the content display device 100, 300 based upon the distance the content display device 100, 300 is away from the user. As shown, when in operation, content is obtained (e.g., via the application 116, 316) to display on the content display device 100, 300 (Block 600), and distance information is obtained that is indicative of a distance that the user is away from the content display device (Block 602).

As depicted, data is then accessed on the content display device 100, 300 to retrieve content-size information that is associated with the distance information (Block 604). In many embodiments the data that is accessed includes the calibration data 112, 312 that is generated by the process discussed with reference to FIG. 5, but it is also contemplated that the content-size information may be pre-set data (e.g., default settings) that includes content-size data for two or more distances.

Once the content-size data is accessed, the presentation of content on the content display device 100, 300 is adjusted (Block 606). For example, the size of text and/or other non-text content is adjusted to increase the size of content when the content display device is farther away from the user and to decrease the size of content when the content display device is closer to the user.

In some variations of the embodiment depicted in FIG. 3, the user face processing component 307 may be enhanced to detect the presence of glasses on the face of the user, and the user detection component 308, in connection with the content adjust engine 314, may be adapted to adjust the size of the displayed content based upon whether the glasses of the user are on or off. This functionality may be very useful for people who want to quickly look at the content display device 300 (e.g., to check a website) and cannot find their glasses.

For example, if the calibration data 312 has been collected (e.g., as detailed with reference to FIG. 5) for a user with both glasses on and with glasses off, if the user face processing component 307 does not detect glasses on the user during operation, the user distance detection component 308 may access a particular dataset in the calibration data 312 to obtain content-size information that the user generated without having glasses on during calibration. Or alternatively, the content-size information in the calibration data may be the same regardless of whether a user has glasses on or off, but an additional scaling factor may be applied to the content-size data to make the content readable when the user face processing component 307 detects that the user does not have glasses on. It is contemplated that the scaling of text and non-text content may be either up or down depending upon whether the user has myopia or hypermetropia.

In addition, the content display device 300 depicted in FIG. 3 may be enhanced to operate when two people are detected. As one of ordinary skill in the art will appreciate, the user face processing component 307 may be adapted to identify two or more faces in a captured image, and the content adjust engine 314 may adjust the content based upon a compromise between the two user's calibration data (if the two users have different calibration settings). It is also possible to implement age detection technology in the user face processing component 307 so that if one of the detected users is young (e.g., when an adult is reading to a child) then the adjustment of the content size may be made based upon the older user's calibration settings.

Figure 7:
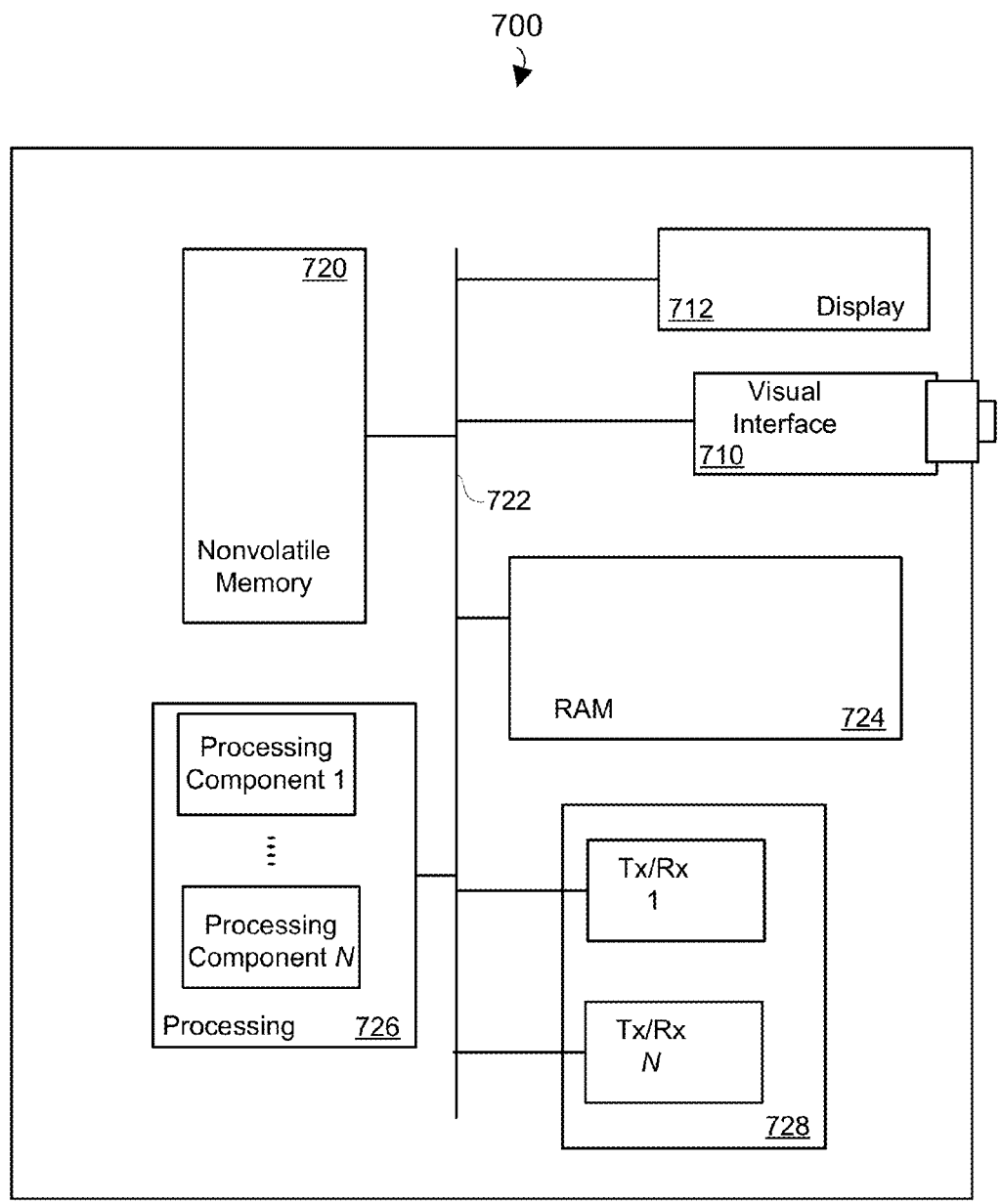
FIG. 7 is a block diagram depicting functional components of an exemplary mobile device according to an embodiment of the invention.

Referring next to FIG. 7, shown is a block diagram depicting physical components of an exemplary embodiment of content display device 700. As shown, a visual interface 710, display portion 712, and nonvolatile memory 720 are coupled to a bus 722 that is also coupled to random access memory ("RAM") 724, a processing portion (which includes N processing components) 726, and a transceiver component 728. Although the components depicted in FIG. 7 represent physical components of an imaging device (e.g., content display device 100, 300) it is not intended to be a hardware diagram; thus many of the components depicted in FIG. 7 may be realized by common constructs or distributed among additional physical components. Moreover, it is certainly contemplated that other existing and yet-to-be developed physical components and architectures may be utilized to implement the functional components described with reference to FIG. 3.

In general, the nonvolatile memory 720 functions to store (e.g., persistently store) data and executable code including code that is associated with the functional components depicted in FIGS. 1 and 3. In some embodiments of the content display device 300 depicted in FIG. 3 for example, the nonvolatile memory 720 includes bootloader code, modem software, operating system code, file system code, and code to facilitate the implementation of one or more portions of the visual interface 304, the image processing component 306, the I/O portion 302, the user face processing component 307, the user distance detection component 308, dock detection component 310, and content adjustment engine 314 and operations of the display 318.

In many implementations, the nonvolatile memory 720 is realized by flash memory (e.g., NAND or ONENAND™ memory), but it is certainly contemplated that other memory types may be utilized as well. Although it may be possible to execute the code from the nonvolatile memory 720, the executable code in the nonvolatile memory 720 is typically loaded into RAM 724 and executed by one or more of the N processing components in the processing portion 110.

The visual interface 710 in the embodiment depicted in FIG. 7 may be realized by a variety of distributed and/or integrated components including optical components, sensors (e.g., CCD or CMOS), A/D components and digital processing components (e.g., associated with the image processing component) to render digital representations of images to the user face processing component 307.

The N processing components 726 in connection with RAM 724 generally operate to execute the instructions stored in nonvolatile memory 720 to effectuate the functional components depicted in FIGS. 1 and 3. As one of ordinarily skill in the art will appreciate, the processing components 726 may include a video processor, modem processor, DSP, graphics processing unit (GPU), and other processing components.

The depicted transceiver component 728 includes N transceiver chains, which may be used in connection with realizing the I/O portion 332, for communicating with external devices, including a target object. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a transceiver component 728 for simplicity, it is certainly contemplated that the transceiver chains may be separately disposed about the content display device 700.

This display 712 generally operates to provide text and non-text content to a user. Although not depicted for clarity, one of ordinary skill in the art will appreciate that other components including a display driver and backlighting (depending upon the technology of the display) are also associated with the display 712.

In conclusion, embodiments of the present invention enable a content display device to dynamically adjust the size of content based upon a distance between the user and the content display device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:
1. A method for displaying content on a mobile device, the method comprising:
    obtaining content to display on the mobile device;
    obtaining distance information indicative of a distance that separates a user from the mobile device, wherein obtaining distance information includes:
        capturing an image of the user with a camera of the mobile device; and
        determining a ratio of a size of the user's face in the image to a size of the image as a whole, the ratio indicating a distance that separates the user from the mobile device;

accessing content-size data on the mobile device that is associated with the distance information, wherein accessing content-size data on the mobile device includes accessing data that associates the ratio of the size of the user's face with a content-size;
adjusting a presentation of content on the mobile device based upon the content-size data;
prompting, during a calibration phase, a user to hold the mobile device at each of a plurality of distances from the user;
determining the ratio of the size of the user's face in a calibration image to a size of the calibration image as a whole; and
obtaining, from the user, content-size information for each of the plurality of distances from the user.

2. The method of claim 1, wherein obtaining distance information includes:
sensing the distance that separates the user from the mobile device with a sensor, wherein the sensor is an infrared sensor, an ultrasonic sensor, or an optical sensor.

3. The method of claim 1, including:
identifying whether the user is wearing glasses; and
adjusting the presentation of content based upon whether the user is wearing the glasses.

4. The method of claim 1, including:
identifying two users in the image; and
adjusting the presentation of content based upon: the age of one of the two users, a position of one of the two users relative to another of the two users, or adjusting the presentation of the content as a compromise to both of the two users.

5. A mobile device, comprising:
an application associated with content that is displayed on the mobile device;
a sensor and sensor processing components to provide information from the sensor that includes an indication of a distance that separates a user from the mobile device;
a user distance detection component that is configured to:
estimate, based upon the indication, the distance the user is away from the content display device and access content-size data that is associated with the distance;
access data that associates the ratio with a content-size;
prompt, during a calibration phase, a user to hold the mobile device at each of a plurality of distances from the user;
determine the ratio of the size of the user's face in a calibration image to a size of the calibration image as a whole; and
obtain, from the user, content-size information for each of the plurality of distances from the user; and
a content adjust engine that is configured to adjust a presentation of the content that is displayed on the mobile device based upon the content-size data.

6. The mobile computing device of claim 5, wherein the sensor is an infrared sensor, an ultrasonic sensor, or an optical sensor.

7. The mobile computing device of claim 5, wherein the sensor includes a visual interface and the sensor processing components include an image processing component, the visual interface in connection with the image processing component capture an image of the user, the mobile computing device also including:
a user face processing component to detect a user's face in the image that is generated by the image processing component;
wherein the user distance detection component is configured to estimate, based upon a ratio of a size of the user's face in the image to a size of the image as a whole, the distance the user is away from the content display device.

8. The mobile computing device of claim 7, wherein the user face processing component is configured to identify whether the user is wearing glasses; and
the content adjust engine is configured to a adjust a presentation of the content based upon whether the user is wearing the glasses.

9. The mobile computing device of claim 7, wherein the user face processing component is configured to identify two users in the image; and
the content adjust engine is configured to adjust the presentation of content based upon the age of one of the two users, a position of one of the two users relative to another of the two users, or adjusting the presentation of the content as a compromise to both of the two users.

10. A mobile computing device, comprising:
means for obtaining content to display on the mobile device;
means for obtaining distance information indicative of a distance that separates a user from the mobile device wherein the means for obtaining distance information includes:
means for capturing an image of the user with a camera of the mobile device; and
means for determining a ratio of a size of the user's face in the image to a size of the image as a whole, the ratio indicating a distance that separates the user from the mobile device;
means for accessing content-size data on the mobile device that is associated with the distance information wherein the means for accessing content-size data on the mobile device includes means for accessing data that associates the ratio of the size of the user's face with a content-size;
means for prompting, during a calibration phase, a user to hold the mobile device at each of a plurality of distances from the user;
means for determining the ratio of the size of the user's face in a calibration image to a size of the calibration image as a whole;
means for obtaining, from the user, content-size information for each of the plurality of distances from the user; and
means for adjusting a presentation of content on the mobile device based upon the content-size data.

11. The mobile computing device of claim 10, wherein the means for obtaining distance information includes:
means for sensing the distance that separates the user from the mobile device with a sensor, wherein the sensor is an infrared sensor, an ultrasonic sensor, or an optical sensor.

12. The mobile computing device of claim 10, including:
means for identifying whether the user is wearing glasses; and
means for adjusting the presentation of content based upon whether the user is wearing the glasses.

13. The mobile computing device of claim 10, including:
means for identifying two users in the image; and
means for adjusting the presentation of content based upon: the age of one of the two users, a position of one of the two users relative to another of the two users, or adjusting the presentation of the content as a compromise to both of the two users.

14. A non-transitory, tangible computer readable storage medium, encoded with processor readable instructions to perform a method for displaying content, the method comprising:
- obtaining distance information indicative of a distance that separates a user from the mobile device, wherein obtaining distance information includes:
- capturing an image of the user with a camera of the mobile device; and
- determining a ratio of a size of the user's face in the image to a size of the image as a whole, the ratio indicating a distance that separates the user from the mobile device;
- accessing content-size data on the mobile device that is associated with the distance information, wherein accessing content-size data on the mobile device includes accessing data that associates the ratio of the size of the user's face with a content-size;
- adjusting a presentation of content on the mobile device based upon the content-size data;
- prompting, during a calibration phase, a user to hold the mobile device at each of a plurality of distances from the user;
- determining the ratio of the size of the user's face in a calibration image to a size of the calibration image as a whole; and
- obtaining, from the user, content-size information for each of the plurality of distances from the user.

15. The non-transitory, tangible computer readable storage medium of claim 14, wherein obtaining distance information includes:
- sensing the distance that separates the user from the mobile device with a sensor, wherein the sensor is an infrared sensor, an ultrasonic sensor, or an optical sensor.

16. The non-transitory, tangible computer readable storage medium of claim 14, the method including:
- identifying whether the user is wearing glasses; and adjusting the presentation of content based upon whether the user is wearing the glasses.

17. The non-transitory, tangible computer readable storage medium of claim 14, the method including: identifying two users in the image; and adjusting the presentation of content based upon: the age of one of the two users, a position of one of the two users relative to another of the two users, or adjusting the presentation of the content as a compromise to both of the two users.

* * * * *